Patented May 23, 1939

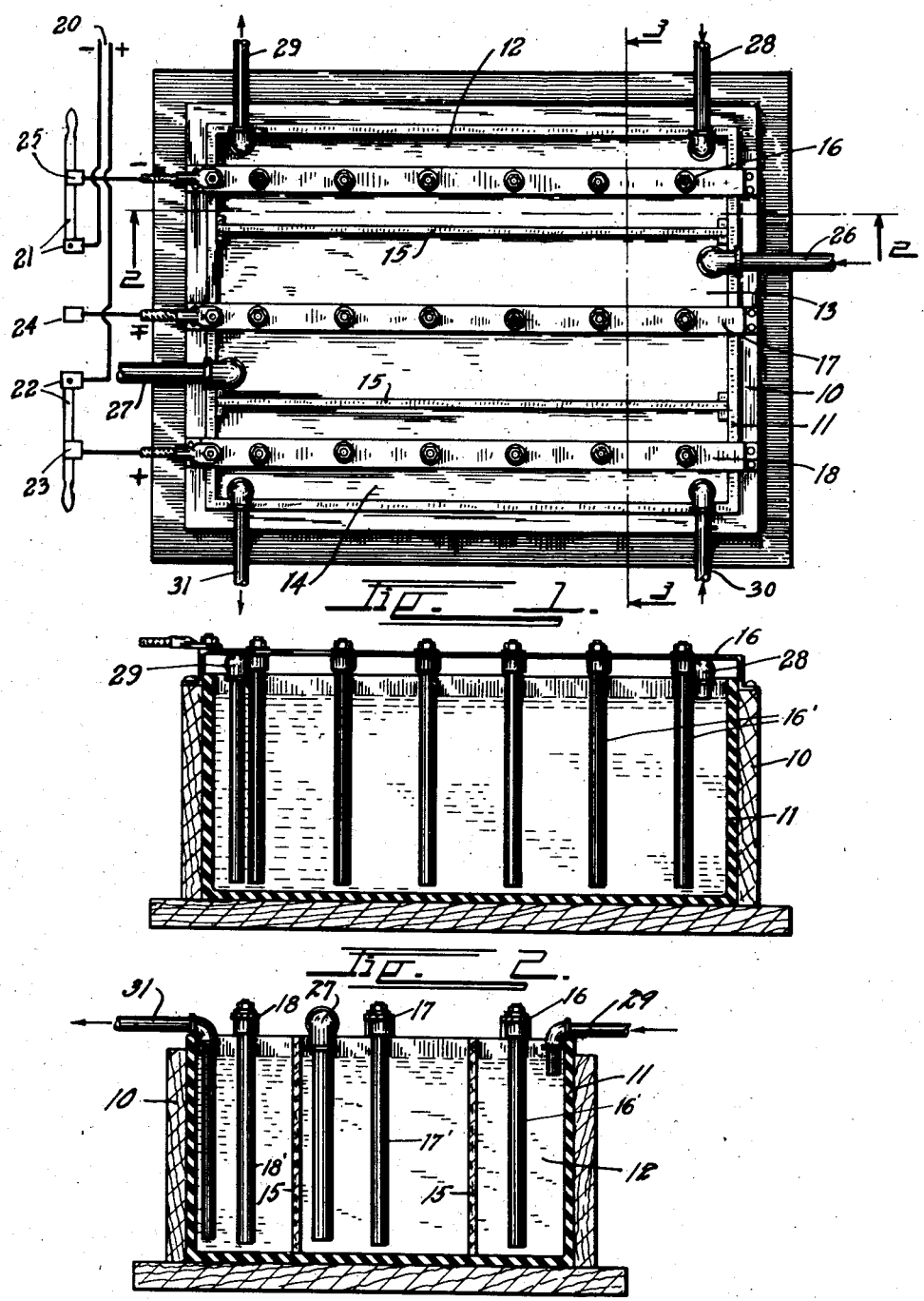

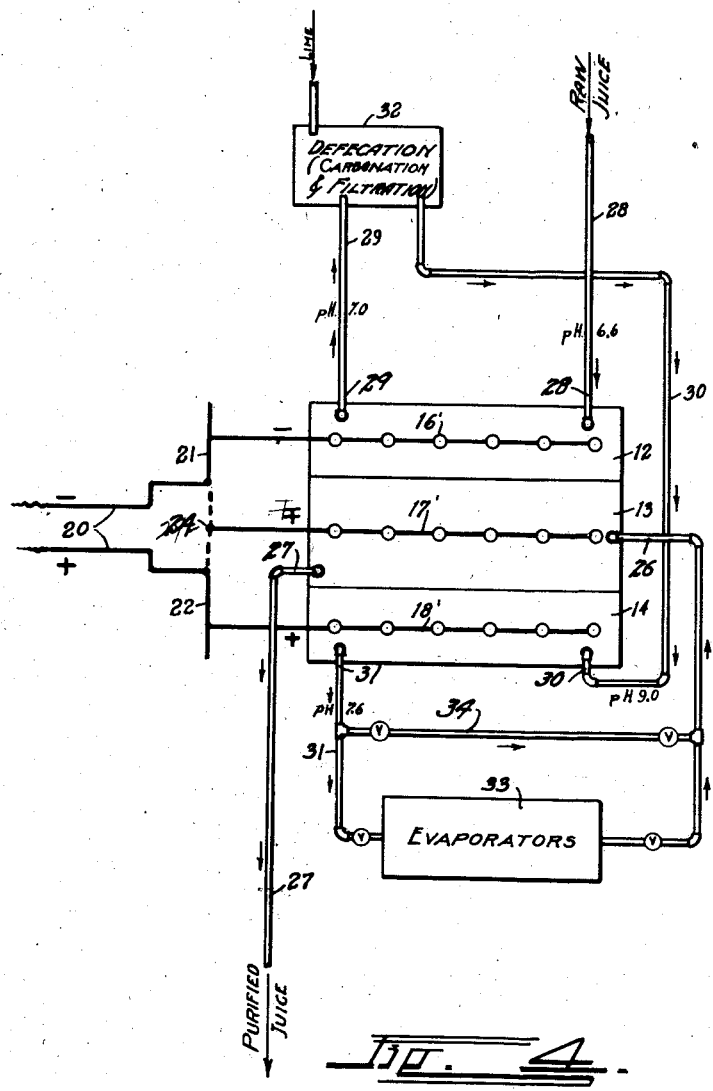

2,159,074

UNITED STATES PATENT OFFICE 2,159,074

PROCESS FOR VARYING THE pH VALUE OF SOLUTIONS

Robert E. Briggs, Rocky Ford, Colo.

Application April 5, 1937, Serial No. 135,105

3 Claims. (Cl. 204—24)

This invention relates to a process for varying the ion concentration in industrial solutions where definite and precise alkalinities or pH values are highly desirable. It is more particularly intended for use in sugar factories and sugar refining plants where constant and regular pH values give increased efficiency in evaporation and crystallization and improved settling rates, for the purification of the raw juice and intermediate liquors. Its application, however, is not limited to this particular use, but will be found valuable wherever the establishing of an optimum alkalinity for ion concentration will increase yields in precipitates and where it is desirable to increase the alkalinity of a solution at one point in the process and decrease the alkalinity thereof at another point therein.

The principal object of the invention is to provide a process whereby the alkalinity or ion concentration can be exchanged between two solutions, or between two portions of the same solution, so that one will be benefited by a desirable increase in alkalinity while the other is simultaneously benefited by a desired corresponding decrease in alkalinity.

A further object is to provide a process for refining the raw juice in a beet sugar factory which will reduce the quantity of lime required; which will reduce or eliminate the use of sulphur dioxide; which will result in a higher quality of sugar at a reduced cost and which will accomplish all necessary alkalizing and acidifying by a simple exchange of ions between solutions without additional reagents Other objects of the invention are, to provide an electrolytic cell in which the electrical resistance of the electrolyte can be varied when desired by shortening the path of current flow so as to reduce power consumption on comparatively pure solutions; and to provide a multi-stage electrolytic cell in which the polarity of the final stage will be controllable to deliver the solution at any desired degree of neutrality, alkalinity or acidity.

Other objects reside in the process and other advantages result from the use thereof which will become more apparent from the following description.

In the drawings:

Fig. 1 illustrates a plan view of the preferred form of electrolytic cell with its connections for use in carrying out the improved process.

Fig. 2 is a longitudinal section therethrough, taken on the line 2—2, Fig. 1.

Fig. 3 is a cross section, taken on the line 3—3, Fig. 1.

Fig. 4 is a flow sheet illustrating the process applied to the raw juice of a sugar factory.

The apparatus consists of a tank 10, lined with rubber, Bakelite or other suitable solution resistant, electrical insulating material 11. The tank 10 is divided into three cells or compartments 12, 13, and 14 by means of porous diaphragms or partitions 15. The partitions may be formed of any suitable dielectric material which will provide exceedingly high porosity and fluid-permeable qualities such as alundum, ceramic plates, spun glass, etc.

Electrode bars 16, 17, and 18 extend longitudinally over the cells 12, 13, and 14, respectively. From each of the bars 16, 17, and 18, a series of insoluble electrodes 16', 17', and 18', respectively, depend. The electrodes may be made of any suitable electrical conducting material depending upon the particular solution being treated. In the usual case, however, the electrodes are carbon or graphite.

Current is fed to the electrodes from any suitable direct current source through feed mains 20. The mains 20 lead to two single-pole, double-throw switches 21 and 22. The switch 22 may close a contact 23 leading to the electrode bar 18, or a contact 24 leading to the electrode bar 17. The switch 21 can close a contact 25 leading to the electrode bar 16 and can also close the contact 24 to the bar 17.

An inlet pipe 26 and a discharge pipe 27, communicate with central compartment 13. A second intake pipe 28, and a discharge pipe 29 feed the compartment 12 and a similar intake pipe 30 and a discharge pipe 31 serve the compartment 14. Since the current supply to compartment 12 is always negative it will herein be referred to as the "cathode compartment" and similarly the compartment 14 will be referred to as the "anode compartment." The electrodes 17' in the middle compartment may be either positive or negative depending upon the position of the switches 23 and 25.

In the various fields of industrial chemistry compounds are encountered which in their pure state are classed as non-electrolytes, that is, they do not yield electrically charged ions in solution and the solutions are not conductors of electricity. The manufacture of these compounds usually involves extraction of a fluid from some plant life as a dilute solution in water which becomes unavoidably contaminated with a class of compounds known as electrolytes, that is they yield electrically charged ions in solution and are conductors of electricity.

The presence of these electrolytes is usually undesirable and particularly so when either the positive or the negative ions are in excess of the other. If the quantity of positive hydrogen ions present in a solution is balanced by the negative hydroxyl ion the solution is said to have pH value of 7.0 or to be neutral in terms of alkalinity and acidity.

A solution containing an excess of positively charged hydrogen ions (H+) is said to be acid or to have a pH value below 7.0. When the solution contains an excess of negative hydroxyl ions (OH—) it is said to be alkaline or to have a pH value above 7.0.

The elimination of these contaminating electrolytes, and also certain organic impurities from the extracted liquor, involves a purification problem which has been attacked from many angles. At certain stages in the process chemicals are added to make the solution excessively alkaline with an object of bringing about a precipitation and removal of the impurities. This necessitates further chemical treatment to bring the solution back to approximately the neutral point for final concentration.

Electrolytic diaphragm cells have been used, but no means were provided to control the interchange of ions between (or among) regularly involved or commercial process liquors during electrolysis so that an exchange of ions may be effected between two or more commercial solutions for the benefit of all.

These cells were used simply for a one-way removal of ions from a commercial solution to a waste solution. In the present process, however, a two way transfer or interchange is provided between either two or three commercial solutions whereby the ion exchange is controllable between either of two useful solutions and/or between either of the two solutions and a third commercial solution so that the acidity or neutrality of one or more given solutions can be controlled at all times during the electrolysis.

In the apparatus illustrated, the polarity of the electrodes in the central cell 13 can be made either positive, negative or neutral as the situation may demand by means of the control-switches 21 and 22, which can throw these electrodes into either the positive or negative side of the circuit.

Let us assume that the compartments are filled with solution and that the two outside electrode bars 16 and 18 are of negative and positive polarity, respectively, in a D. C. circuit as illustrated in Fig. 1. Under the influence of the direct current, the positive ions, for instance sodium (Na+), will migrate from the solutions in compartments 13 and 14 toward and into the solution in the cathode compartment 12, where contact with the negative electrode neutralizes their charges and sodium metal is formed. The sodium metal dissolves in the water in the solution to form sodium hydroxide (NaOH) and the alkalinity of the solution in this compartment is thereby increased. At the same time, acid hydrogen ions (H+) are discharged and the hydrogen gas is evolved.

At the electrodes in compartment 14, which of course are anodes to the solution, negative chlorine ions (Cl—) are neutralized, and the chlorine gas is liberated. Oxygen is also evolved according to the principle of electrolysis of water, and hydroxyl ions are reduced and the alkalinity of the solution in the anode compartment 14 is brought down to the desired point. Therefor the alkalinity of the solution entering compartment 12 is increased at it passes through the compartment and the alkalinity of the solution passing through compartment 14 is decreased.

Other reactions are involved in the process, the above being given as examples only. The most common contaminating compounds are those of sodium, potassium, magnesium, calcium, phosphorus, nitrogen, chlorine, sulphur, and oxygen. Sodium, potassium, magnesium, and calcium form the principal positive ions, and their nitrates, chlorides, phosphates, and sulphates form the principal negative ions or radicals.

There is a tendency for the H+ ions and the OH— ions to neutralize each other in the central compartment to form pure water which dilutes the solution but this is more than balanced by loss of water by electrolysis and the concentration of the liquor is slightly increased. The heat generated by the transfer or electrical energy through the solution is also utilized as an evaporation factor. More contaminating ions pass out of the solution in the central compartment than enter it and its purity is thereby improved.

At times, the solutions entering the outside compartments through the pipes 28 and 30 may be of extremely high purity, that is, they will contain a very low percentage of electrolyte. This of course, increases the electrical resistance between the electrodes in compartment 12 and the electrodes in compartment 14 and naturally increases the electrical energy required. In such cases, either of the switches 21 or 22 may be thrown to the center contact 24, thereby shortening the electrical path through the solution and reducing the power consumption.

In practice, a raw liquor in the acid stage is circulated through the cathode compartment 12, where it becomes slightly alkaline. It is then drawn off through the pipe 29 for a chemical treatment to precipitate and remove the impurities, and is returned through the anode compartment 14 through the pipe 30 for a reduction of alkalinity. The overflow from compartment 14 may be either circulated through the central compartment 13 for further purification or it may be passed on to an evaporation process and returned in more concentrated form to compartment 13. A slightly alkaline solution introduced into the cathode compartment 12 can be treated in the same manner to increase its pH value and the solution in the anode compartment 14 can be made acid if desired.

It will be noted that the flowing processed solutions, themselves serve as wash liquors for the electrodes, thus keeping the concentration of ions in the electrode compartments at a low figure, and that losses due to seepage of the processed ingredient are avoided.

An example of the practical application of this invention as applied to the treatment of the raw juice in the manufacture of beet sugar, for which it was particularly designed, but to which it is by no means limited, is illustrated in the flow diagram of Fig. 4.

In such a use, raw juice from the diffusion battery of a beet sugar factory is continuously passed through the cathode compartment 12. The electrodes 16' and 18' are in circuit, with respective negative and positive polarity. The juice enters at 27 at a pH valve varying from 6.4 to 6.8 and leaves at 29 at a pH value above 7.0. The practice of adding milk of lime to the juice at this stage as a predefecation alkalizer is completely eliminated.

The juice, now on the alkaline side, proceeds to a carbonation station 32 where it undergoes the usual factory defecation, that is, liming, carbonation and filtration, purification. The filtered second carbonation or defecated juice at a pH valve of about 9.0 is flowed continuously through the pipe 30 into the anode compartment 14 where the alkalinity is reduced to about 7.6 pH. The liquor leaving compartment 14 at 31 may be directly recirculated through the central compartment 13 where it gives up both positive and negative ions to improve its purity or the juice from compartment 14 may be bypassed to an evaporator 33 and introduced as a more concentrated liquor into the central compartment for purification.

When the juice entering compartment 12 is extracted from normal beets and the purity is high and pH control only, is needed, the switch 22 may be thrown to the contact 24 of central electrode to form an anode compartment of the central compartment directly adjacent the cathode compartment 12. This shortens the current path through the high resistant pure juice and reduces the electrical energy required for pH control. With unripe or decayed beets, purity being low and colloidal content high, the use of the outside electrodes is recommended. The switching of electrodes is controlled by an efficiency factor based on the cost of electrical energy and benefits derived from a higher purity juice which varies at different factories.

By application of this process the lime predefecation factor is eliminated and the quantity of lime required for purification materially reduced due to the return of active ions to the process. The alkalinity of the defecated juice is brought down to the desired point without the use of sulphur dioxide gas which contaminates the liquor and the final product (sugar) with the objectionable sulphite radical.

The liberation of nascent chlorine and oxygen at the anodes accomplishes a bleaching and decolorizing effect corresponding to that of the sulphur dioxide gas. Colloids in the raw juice are neutralized and coagulated and the lime purification process becomes more effective. The final result is a higher quality sugar at a reduced processing cost.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a sugar refining process having raw juices and second carbonation juices, a method of simultaneously reducing the alkalinity of the carbonation juices, to increase the efficieney of crystallization, while increasing the alkalinity of the raw juices to precipitate the alkaline earth metals therefrom for softening said juices comprising: simultaneously flowing both juices independently through an electrolytic cell, the raw juices through the cathode compartment and the carbonation juices through the anode compartment, to effect a transfer of positive ions from the carbonation juices to the raw juices, thus employing the undesirable ions in the carbonation juices to effect a purification of the raw juices; and drawing off the two juices from said cell independently of each other.

2. In a juice refining process a method of simultaneously purifying the raw juices and the carbonation juices therein comprising: flowing the raw juices through the cathode compartment of an electrolytic cell; continuously withdrawing the electrolized juice from the cell; subjecting the juices to carbonation; flowing the carbonation juices back through the anode compartment of the same cell while maintaining the flow of the raw juices through the cathode compartment; and continuously withdrawing the electrolized carbonation juices from said anode compartment.

3. In a juice refining process a method of simultaneously purifying the raw juices and the carbonation juices therein comprising: flowing the raw juices through the cathode compartment of an electrolytic cell; continuously withdrawing the electrolized juice from the cell; subjecting the juices to carbonation; flowing the carbonation juices back through the anode compartment of the same cell while maintaining the flow of the raw juices through the cathode compartment; continuously withdrawing the electrolized carbonation juices from said anode compartment; subjecting the withdrawn juice to evaporation to increase its concentration; thence flowing the concentrated juice through a compartment in said cell intermediate said anode and cathode compartments, so that both negative and positive undesirable ions will be removed therefrom for final purification.

ROBERT E. BRIGGS.